United States Patent [19]
Endsley et al.

[11] Patent Number: 5,841,471
[45] Date of Patent: Nov. 24, 1998

[54] TIMING CONTROL FOR A DIGITALLY INTERFACED CAMERA USING VARIABLE LINE READOUT INTERVALS

[75] Inventors: Jay A. Endsley, Fairport; Thomas N. Berarducci, Webster; Kenneth A. Parulski, Rochester, all of N.Y.

[73] Assignee: Eastman Kodak Company, Rochester, N.Y.

[21] Appl. No.: 712,689

[22] Filed: Sep. 12, 1996

[51] Int. Cl.$^6$ .............................. H04N 5/76; H04N 5/225; H04N 7/00
[52] U.S. Cl. ........................... 348/231; 348/220; 348/552
[58] Field of Search .................................. 348/552, 312, 348/231, 222, 220

[56] References Cited

U.S. PATENT DOCUMENTS

| | | | |
|---|---|---|---|
| 4,205,337 | 5/1980 | Millward | 358/54 |
| 5,309,247 | 5/1994 | Kinoshita et al. | 348/312 |
| 5,475,441 | 12/1995 | Parulski et al. | 348/552 |
| 5,506,617 | 4/1996 | Parulski et al. | 348/552 |
| 5,517,241 | 5/1996 | Adachi et al. | 348/231 |
| 5,568,192 | 10/1996 | Hannah | 348/552 |

OTHER PUBLICATIONS

"Universal Serial Bus to Simplify PC I/O; New Interface to Service Keyboards, Mice, Telecom, and More" by Michael Slater from *Microprocessor Report*, vol. 9, No. 5, Apr. 17, 1995.

*Primary Examiner*—Andrew I. Faile
*Assistant Examiner*—Alicia M. Harrington
*Attorney, Agent, or Firm*—David M. Woods

[57] ABSTRACT

A digital camera is designed to capture images and transfer the captured images to a host computer. The camera includes an image sensor exposed to image light for capturing the images and generating image signals; a timing generator, incorporating a line request control signal, for controlling the readout of lines of photosites from the image sensor; an A/D converter for converting the image signals into digital image data; a digital memory for storing at least one line of digital image data; and a digital interface for providing the digital image data read from the digital memory to the host computer. By initiating a new line readout in response to the line request control signal indicating the fullness of the digital memory, the camera is able to use the image sensor as an analog frame memory, instead of having a full digital frame memory in the camera, so that only a small line store is required.

7 Claims, 5 Drawing Sheets

TIMING CONTROL FOR A DIGITALLY INTERFACED CAMERA USING VARIABLE LINE READOUT INTERVALS

CROSS-REFERENCE TO RELATED APPLICATION(S)

Reference is made to commonly assigned copending applications Ser. No. 08/712,704 entitled "Multi-Mode Digital Camera with Computer Interface Using Data Packets Combining Image and Mode Data" and filed in the names of J. A. Endsley, T. N. Berarducci, and W. Prentice, and Ser. No. 08/712,692 entitled "Tethered Digital Motion/Still Camera Using Dual Mode Software Processing" filed in the names of W. Prentice, K. A. Parulski, and T. N. Berarducci, each filed on the same date herewith and each of which are assigned to the assignee of the application.

FIELD OF THE INVENTION

The invention relates generally to the field of electronic photography, and in particular to a digital camera capable of interfacing with a computer.

BACKGROUND OF THE INVENTION

A number of digital cameras have been developed that "tether" (i.e., connect) to a computer so that still or motion images captured by the camera can be used by the computer. These include still cameras like the Kodak DCS 420 camera sold by the Eastman Kodak Company, which interfaces to a host computer via a SCSI shared bus interface. Since other devices may be connected to the bus while the camera is downloading an image captured by the sensor, a set data rate cannot be "guaranteed" since the "latency" varies depending on the bus requests from other devices on the SCSI bus. Therefore the camera includes a framestore, and the image from the sensor is first stored in the framestore before being downloaded to the computer.

A second type of device, such as is shown in U.S. Pat. No. 5,475,441, "Electronic camera with memory card interface to a computer" uses a dedicated (unshared) interface to the computer, such as a PCMCIA slot on the computer for a memory card. This eliminates the need for a framestore, which is a costly device, but does not allow the bus to be shared by other devices.

What is required is a method for interfacing the digital signal from a digital camera over a low cost shared bus interface, such as USB (universal serial bus), without the need for an expensive frame memory.

SUMMARY OF THE INVENTION

The present invention is directed to overcoming one or more of the problems set forth above. Briefly summarized, according to one aspect of the present invention, a digital camera is designed to capture images and transfer the captured images to a host computer while utilizing only a small line store memory. The camera includes an image sensor exposed to image light for capturing the images and generating image signals; a timing generator, incorporating a line request control signal, for controlling the readout of lines of photosites from the image sensor; an A/D converter for converting the image signals into digital image data; a digital memory for storing at least one line of digital image data; and a digital interface for providing the digital image data read from the digital memory to the host computer, wherein the timing generator initiates a new line readout in response to the line request control signal indicating the fullness of the digital memory.

Consequently, to reduce cost, the camera uses the image sensor as an analog frame memory, instead of having a full digital frame memory in the camera, so that only a small amount of memory, configured as a line store, is required. To accommodate the bus latency, the camera timing generator adjusts the line blanking interval between line readout times.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging devices employing electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as described in the following materials, all such software implementation needed for practice of the invention is conventional and within the ordinary skill in such arts.

Figure 1:
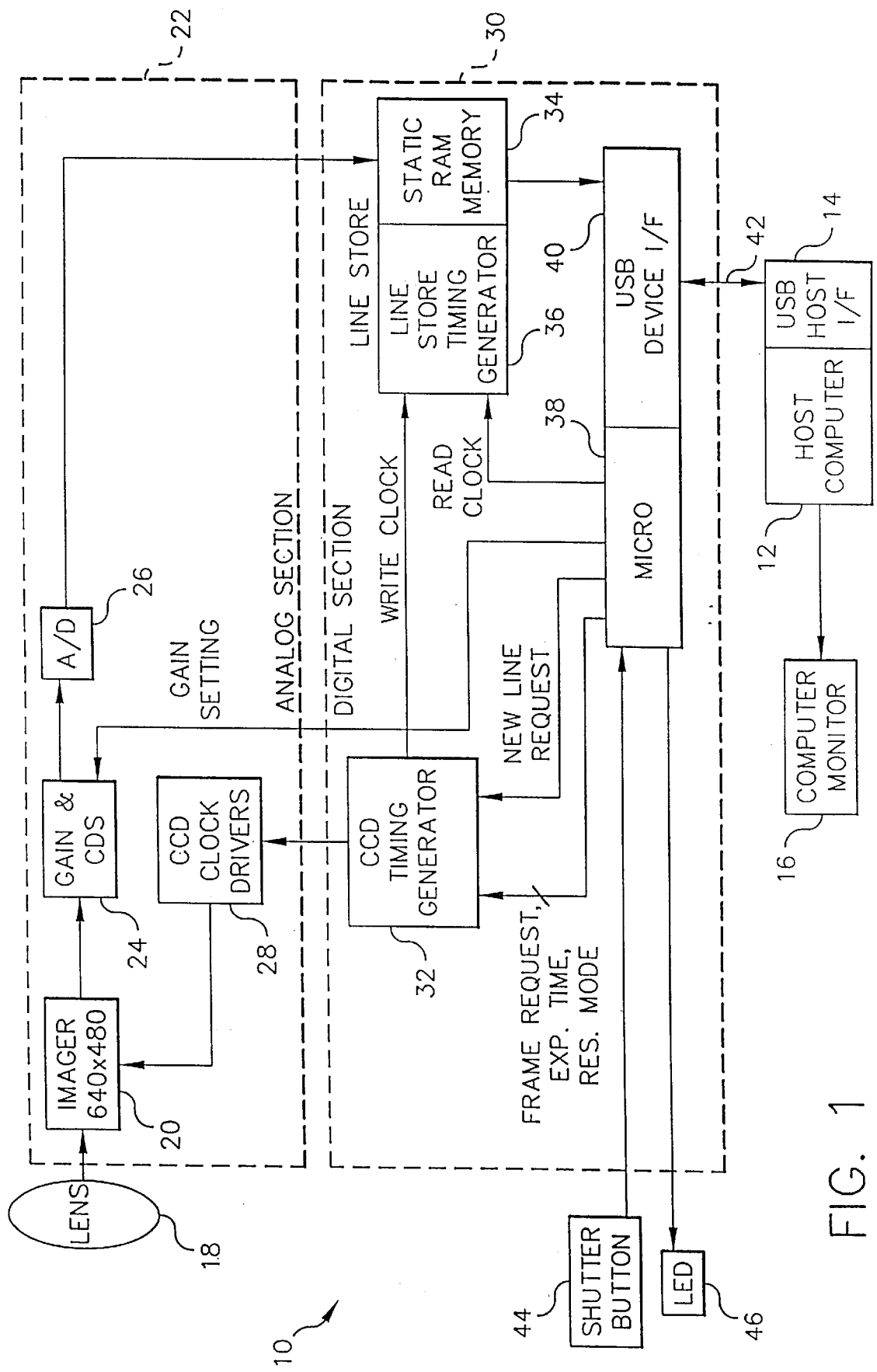
FIG. 1 is a block diagram of a digital imaging system including a digital camera, configured according to the invention, that is tethered to a host computer.

A block diagram of a digital imaging system according to the invention is shown in FIG. 1. The system includes a camera 10 connected to a host computer 12 via a USB (universal serial bus) cable 42 connected to a USB digital host interface 14, which also provides power to the camera 10. USB is a well-known shared bus that can be connected to other devices, such as keyboards, printers, etc. (USB is described in the *Universal Serial Bus Specification*, 1.0 Final Draft Revision, Nov. 13, 1995, which can also be viewed on the Web at http://www.teleport.com/-USB.) The camera 10 can acquire both still and motion images. The camera data is processed by the host computer 12 to create final images that can be displayed on a computer monitor 16, e.g., transmitted along with audio as part of a "computer videoconference", etc. The camera 10 can produce both high quality (i.e., high resolution) still images and high frame rate, reduced resolution motion images.

Figure 2:
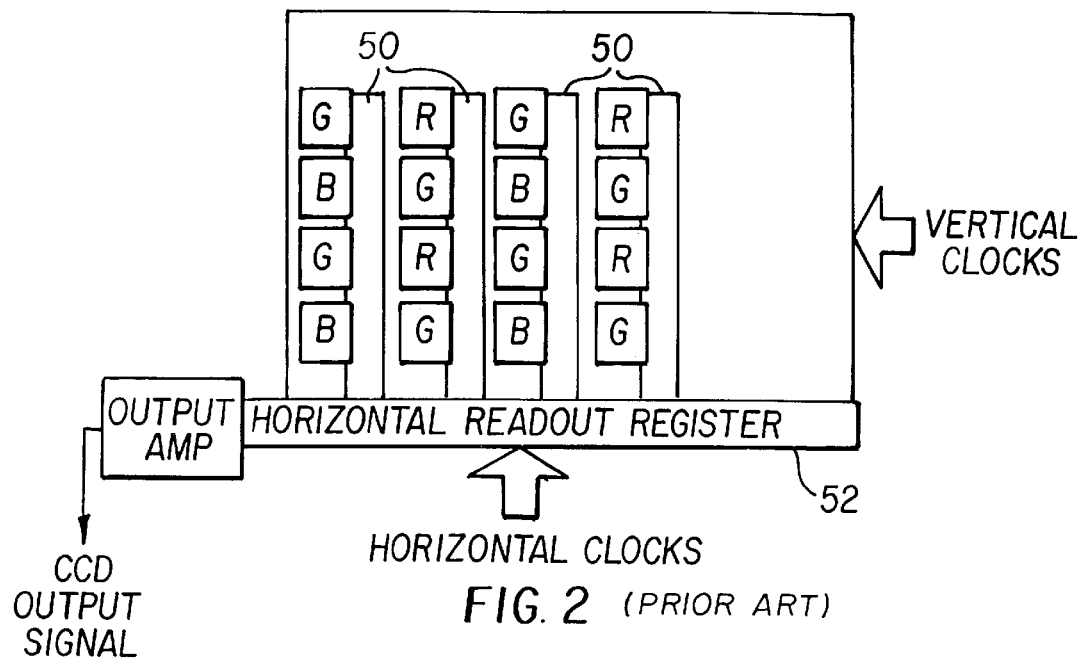
FIG. 2 is an illustration of an image sensor used in the camera shown in FIG. 1, further showing the Bayer color filter pattern.
Figure 3:
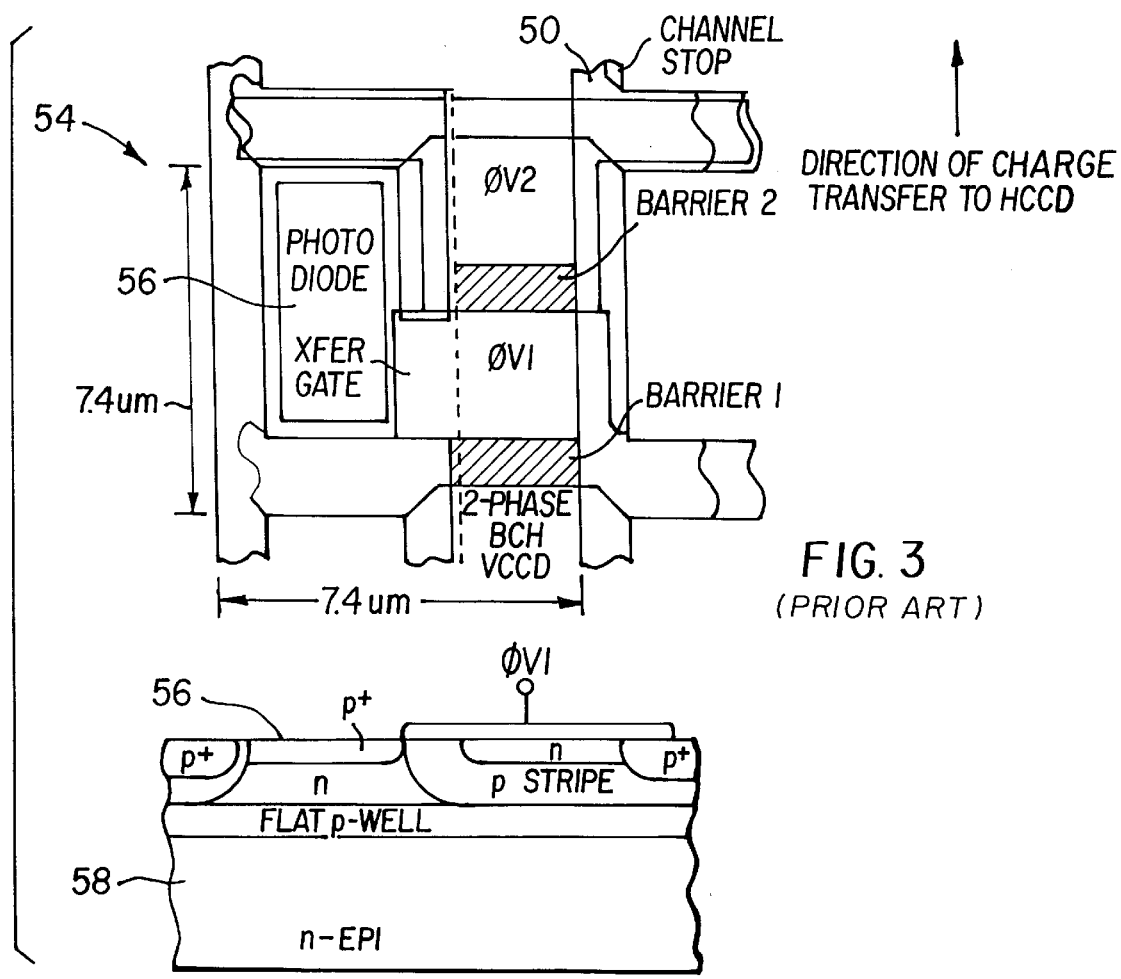
FIG. 3 shows details of a single photoelement in the sensor shown in FIG. 2.

The camera 10 includes an optical section 18 for imaging light from a subject upon an electronic image sensor 20. A preferred image sensor is a Kodak KAI-0320CM interline transfer, progressive-scan charge-coupled-device (CCD) image sensor with a usable active image area having 640 columns and 480 rows of color photoelements arranged in the well-known Bayer color filter array pattern shown in FIG. 2 (see U.S. Pat. No. 3,971,065 for further description of the Bayer pattern). As also shown in FIG. 2, the sensor 20 includes light shielded vertical registers 50 and a horizontal readout register 52. Details of a single photoelement 54 are shown in FIG. 3. Each photoelement 54 includes a light-sensitive photodiode 56 supported on a substrate 58 adjacent the light-shielded vertical register 50.

An analog section 22 in the camera 10 includes the sensor 20, a CDS/gain block 24 for performing correlated double sampling (CDS) and setting the analog gain, an analog-to-digital (A/D) converter 26 for converting the analog output signal from the CCD sensor 20 to, e.g., an 8-bit digital signal, and CCD clock drivers 28 for clocking the sensor 20. A digital section 30 includes a CCD timing generator 32, a static RAM line store memory 34, a line store timing generator 36, a microprocessor 38, and a USB device interface 40. The USB device interface 40 connects to the USB host interface 14 by means of a USB cable 42.

The sensor 20 is controlled by the timing generator 32 via the CCD clock driver 28. The timing generator 32 has a control input for receiving a new line request signal from the microprocessor 38; the new line request signal thus initiates the generation of clock signals to output a new line from the sensor 20. The digital data from the sensor 20 is temporarily stored in the static RAM line store memory 34, preferably a 64K bit static RAM memory (for example part number IDT7164 made by Integrated Device Technology, Inc.) which is controlled by a line store timing generator 36 so as to serve as a line store. Besides controlling the sensor 20, the CCD timing generator 32 also controls the line store write clock applied to the line store timing generator 36.

The output of the line store memory 34 is connected to the host computer 12 via the USB device interface 40, which operates at a maximum data rate of 12M bits/sec. (See the article "Universal Serial Bus to Simplify PC I/O", by Michael Slater in *Microprocessor Report,* Volume 9, Number 5, Apr. 17, 1995 for more detail about the benefits of the USB interface.) The USB interface 40, which may be incorporated as part of the microprocessor 38, such as the Intel 82930 microprocessor, reads data from the line store 34. The USB cable 42 includes four wires, one pair for sending data to and from the host computer 12, and a second pair to supply power to the camera 10 from the host. The camera 10, as shown in FIG. 1, also includes a shutter button 44 for controlling a still or motion image capture sequence and a light emitting diode (LED) 46 for indicating operation of the camera during the capture sequence (i.e., to indicate that the camera is capturing image(s)).

The host computer 12 controls the camera operation. It can instruct the camera 10 when to take still or motion pictures, and set the electronic exposure time via the CCD timing generator 32, and set the analog gain in the CDS/gain block 24 from the microprocessor 38. The USB hardware and software provides communication between the host 12 and the camera 10 through an abstraction called a "pipe". Pipes have associations of data bandwidth, transfer service type, and endpoint characteristics like directionality and buffer sizes. Pipes come into existence when a USB device is configured. USB bandwidth is allocated among pipes. When the camera 10 is connected to the host 12, camera driver software running on the host 12 indicates the latency and bandwidth required for the camera. USB supports various types of pipes, including "isochronous" pipes (which guarantee a continuous data stream using a subset of the USB data rate) and "asynchronous" pipes (which transfer blocks of data but may incur a delay before and during transfer). The camera USB interface has one pipe for transporting control data to the camera and another for transporting image data from the camera. The latter pipe is a "stream" pipe that can use either "bulk" data transfer mode (asynchronous) or isochronous (streaming real time data transfer) mode which occupies a prenegotiated amount of USB bandwidth with a prenegotiated delivery latency. Although the "isochronous" pipe guarantees a continuous data stream, the USB host limits an isochronous device to only a fraction of the USB bandwidth, and in particular a smaller fraction than is achievable with an "asynchronous" pipe.

Figure 4:
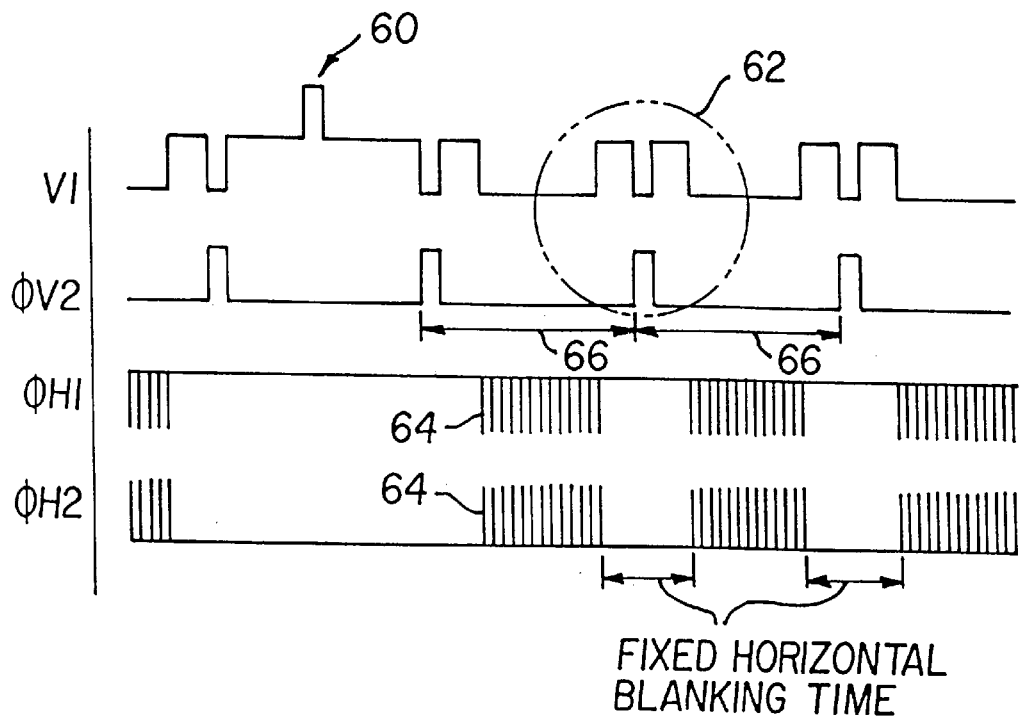
FIG. 4 shows a known timing diagram for the sensor shown in FIG. 2.

In conventional electronic cameras, the timing signals used to transfer out lines of image data repeat in an exact sequence. For example, FIG. 4 shows a prior art timing diagram for the KAI-0320 sensor. The charge is transferred from all of the photodiodes to the light-protected vertical transfer registers when the timing generator 32 drives the V1 pulse to its highest level, which is shown as a readout pulse 60, and referred to as the high "3d level" value. Each group 62 of two V1 pulses and one V2 pulse generated by the timing generator 32 transfers a line of charge into the horizontal readout register 52. Then the timing generator 32 generates horizontal timing pulses 64 to readout the image signal from the horizontal register 52. The dual V1 pulses are used to provide "accumulation mode" timing, as described in U.S. Pat. No. 5,115,458 ("Reducing Dark Current in Charge Coupled Devices"). Note that the time between V2 pulses, or the "line period" 66, is equal for all lines read out from the sensor. This type of timing requires that the USB interface provide a guaranteed data rate during the sensor readout time. This can only be done using the "isochronous" type pipe. Since the USB host allows only a fraction of the USB bandwidth to be used for isochronous type devices, this limits the maximum camera data rate to a relatively small percentage (for example approximately 25% or 3 Mbits/sec) of the USB data rate, even if no other USB devices are connected to the host.

If the asynchronous (block) transfer mode were to be used instead of the isochronous mode, a higher data rate (for example 6 Mbits/sec) could be achieved in many situations. This would allow the camera to transfer either double the number of frames per second, or double the number of pixels per frame, over the USB interface. However, this requires that the sensor data be available in a form appropriate for block transfer. This cannot be done by starting and stopping the horizontal clocking of the image sensor 20 in the middle of a line, since this would create artifacts in the image data. Once the process of reading out one line begins, it must continue until the end of the line. Therefore, the present invention includes a novel way of "line throttle clocking" the image sensor 20 by varying a line blanking interval 68 from line to line, as shown in FIG. 5, so as to transfer lines of data from the CCD image sensor 20 into the line store memory 34 at the appropriate time.

Figure 5:
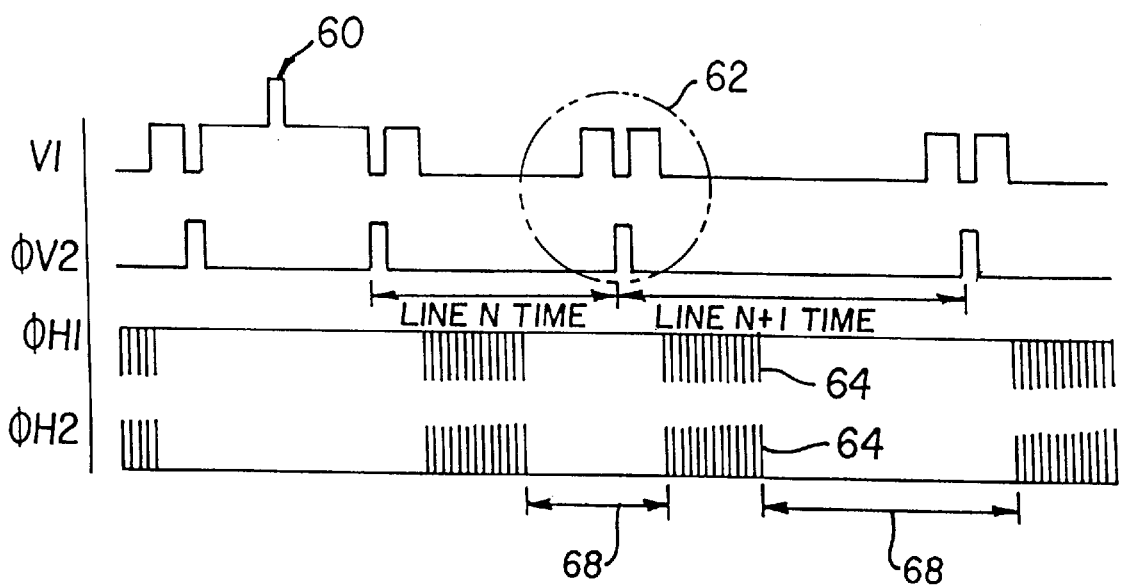
FIG. 5 is a timing diagram for the sensor shown in FIG. 2, which further shows variable line readout intervals according to the invention.

FIG. 5 shows that, once the image data is transferred by the readout pulse 60 to the light-protected vertical registers 50, the line clocking is "throttled" to accommodate the storage capacity of the line store memory 34. The line store memory 34 is capable of storing a small number of lines of data and provides block transfer capability at low cost. Whenever the line store memory 34 has sufficient room to accommodate a new line of image data, the timing generator 32 creates the vertical and horizontal timing pulses 62 and 64 needed to read out the next line from the image sensor, as shown in FIG. 5, and then returns to a wait state until sufficient data is transferred from the line store memory 34 to the computer 12 so as to provide room for the next line. Since the waiting period (equal to the line blanking time) depends on the USB bus traffic, the line readout times and frame readout times are variable, rather than fixed, as in prior art cameras.

Figure 6:
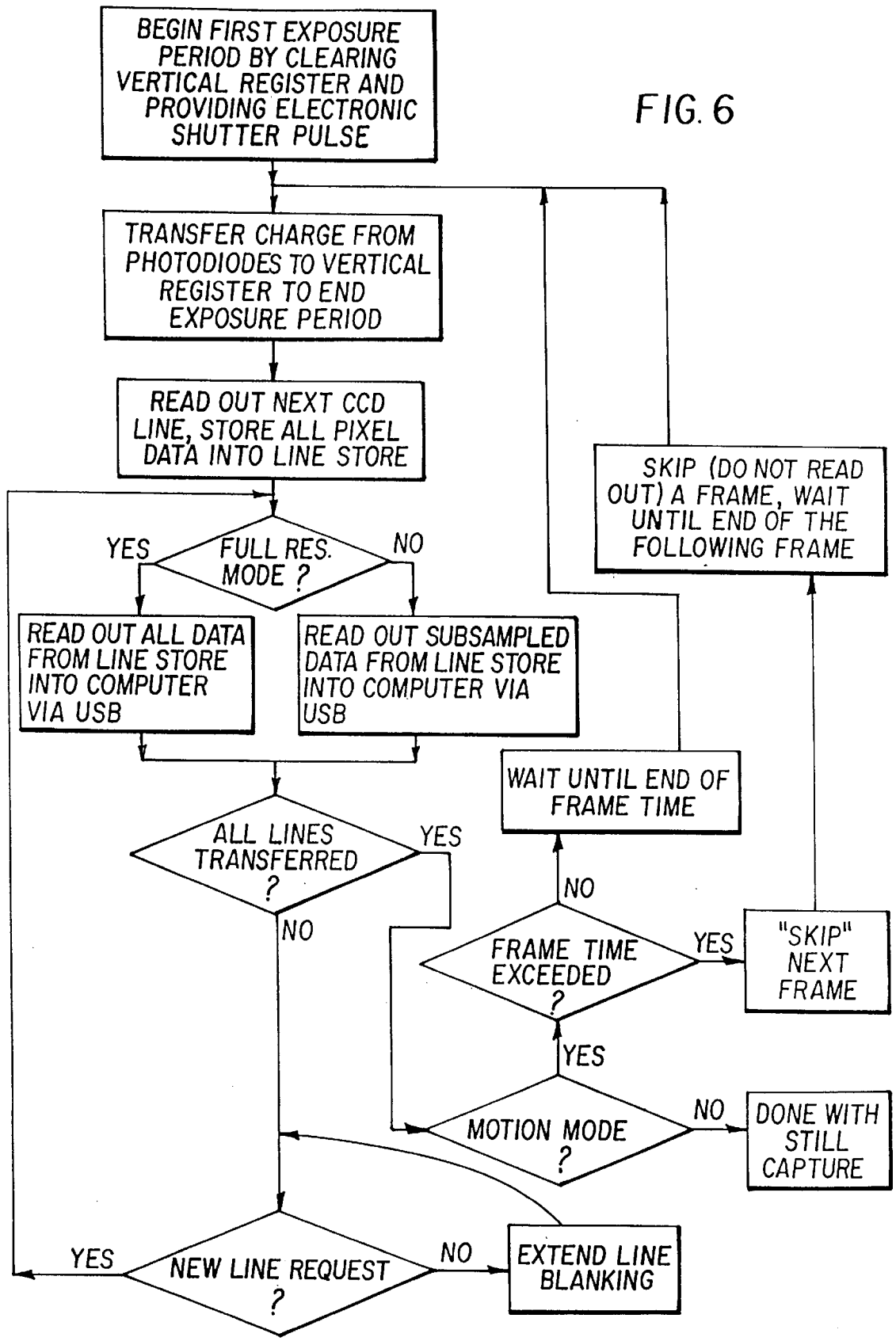
FIG. 6 is a flow diagram of the process of reading out image frames according to the invention.
Figure 7:
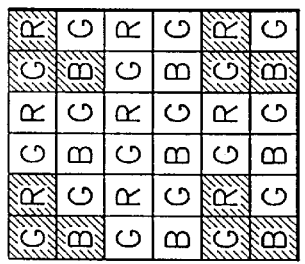
FIG. 7 is an illustration of the Bayer array, showing the image pixels that are transferred in the motion mode.
Figure 8:
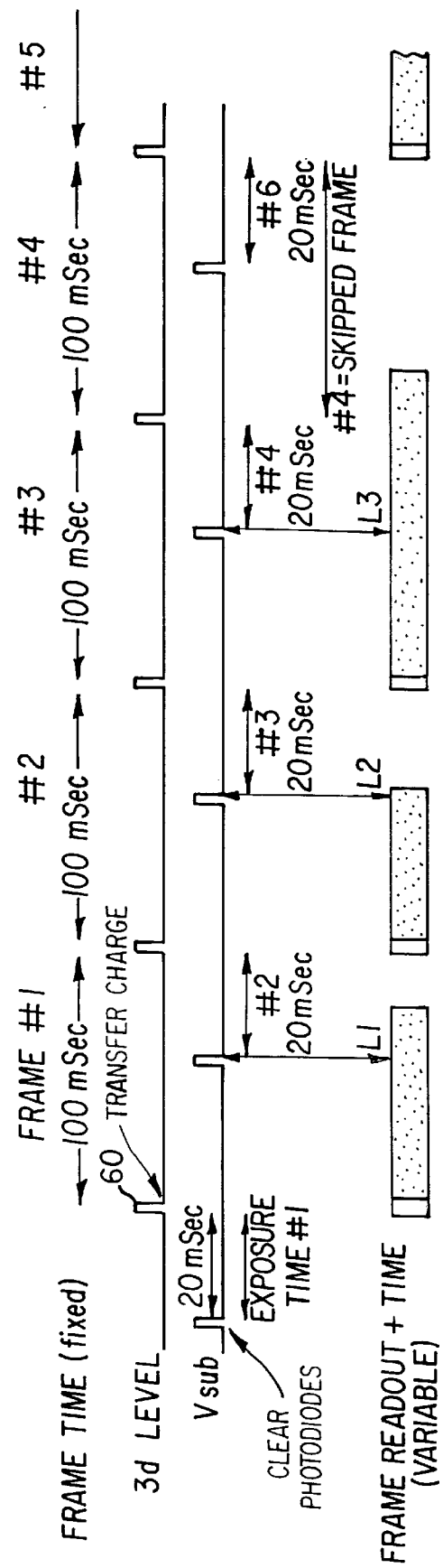
FIG. 8 is a timing diagram showing further detail of variable line readout according to the invention.

The flow diagram of the process of reading out image frames, which is self explanatory, is shown in FIG. 6 and an example of a timing diagram showing some key issues is shown in FIG. 8. In the example shown in FIG. 8, a "motion" series of images is read out at 10 frames per second, so that the time per frame is 100 milliseconds. The photosite integration time begins when the substrate (Vsub) is pulsed high and low, which clears electrons from the photodiode 56 into the substrate 58. The integration time ends when the V1 clock is brought to its high "3d level" value 60, transferring the charge into the vertical shift registers 50. In the example, this exposure time is 20 mSec. Next, all of the pixels of a line are stored in the line store memory 34. Then the microprocessor 38 enables the read clock for the desired pixels to be read into the USB interface 40. In the motion mode, for example, the microprocessor 38 may enable the line store read clock only for the shaded pixels shown in FIG. 7. This reduces the spatial resolution of the motion image, but allows the frame rate to be increased. Since the line store input data rate is greater than the maximum USB rate, there is no chance that the line store will run out of data during a block transfer. When the line store memory 34 is sufficiently empty so as to permit the next line of data to be read from the CCD sensor 20, a new line request is issued by the microprocessor 38 so that the CCD timing generator 32 transfers the next line to the line store memory 34.

In the motion mode, the exposure time for the next image frame begins while the current frame is being read out. A constant exposure time is necessary for the series of images in the motion sequence, to prevent flicker. In prior art cameras using fixed line times and therefore fixed readout times per frame, it is possible to control the electronic shutter pulse by always providing the Vsub (electronic shutter) pulse at the beginning of a particular line (for example prior to reading out line number 400) during the readout of the previous frame. Since in these prior art cameras the time between the beginning of the readout of a particular line and the beginning of the next frame is fixed, the exposure time for each frame will be the same.

In the present invention, however, the time between the beginning of the readout of a particular line and the beginning of the next frame is variable, depending on the USB traffic, since the line blanking times 68 are variable. Therefore, a new method is needed to control the exposure time. This is done by always providing the Vsub (electronic shutter) pulse at a known time prior to the beginning of the next frame, independent of the line number currently being read out. Therefore, for different image frames the Vsub pulse is provided prior to reading out different lines labeled L1, L2, L3, etc. in FIG. 8.

If there are other devices on the USB bus that are transferring large amounts of data during the frame readout period, it is possible that the time required to read out an image will exceed the frame time. In FIG. 8, the time to readout frame #3 is longer than 100 mSec, and "runs into" the frame #4 period. In this case, the next frame (#4) is skipped and is not read out. The camera waits until the beginning of the following frame (#5) before transferring the data for another image frame to the computer.

The invention has been described with reference to a preferred embodiment. However, it will be appreciated that variations and modifications can be effected by a person of ordinary skill in the art without departing from the scope of the invention. For example, while this invention has been described using the USB interface, it is also applicable to other interfaces, including the 1394 serial interface standardized by the IEEE.

| PARTS LIST | |
|---|---|
| 10 | digital camera |
| 12 | host computer |
| 14 | USB digital host interface |
| 16 | computer monitor |
| 18 | optical section |
| 20 | electronic image sensor |
| 22 | analog section |
| 24 | CDS/gain block |
| 26 | A/D converter |
| 28 | CCD clock drivers |
| 30 | digital section |
| 32 | CCD timing generator |
| 34 | static RAM line store memory |
| 36 | line store timing generator |
| 38 | microprocessor |
| 40 | USB device interface |
| 42 | USB cable |
| 44 | shutter button |
| 46 | LED |
| 50 | vertical registers |
| 52 | horizontal readout register |
| 54 | photoelement |
| 56 | light-sensitive photodiode |
| 60 | readout pulse |
| 62 | vertical timing pulses |
| 64 | horizontal timing pulses |
| 66 | line period |
| 68 | variable line blanking interval |

We claim:

1. A digital camera for capturing images and transferring the captured images to a host computer, said camera comprising:

an image sensor exposed to image light for capturing the images and generating image signals;

a timing generator, incorporating a line request control signal, for controlling the readout of lines of photosites from the image sensor, wherein consecutive line readout is separated by a blanking time and the timing generator varies the blanking time between lines;

an A/D converter for converting the image signals into digital image data;

a digital memory for storing at least one line of digital image data; and a digital interface for providing the digital image data read from the digital memory to the host computer, wherein the timing generator initiates a new line readout in response to the line request control signal indicating the fullness of the digital memory.

2. The camera as claimed in claim 1 wherein the digital interface is a USB interface.

3. The camera as claimed in claim 1 wherein the digital memory is a static RAM memory.

4. The camera as claimed in claim 1 wherein the camera further includes a motion capture mode composed of a sequence of frames wherein the exposure time for a subsequent frame of the motion mode sequence is controlled so as to compensate for the variable line blanking intervals of the current readout frame.

5. The camera as claimed in claim 1 wherein there are separate still and motion readout modes.

6. The camera as claimed in claim 5 wherein the sensor is a color sensor and the motion readout mode transfers a subset of the pixels of each color via the digital interface.

7. A method for capturing images and transferring the captured images to a host computer, said method comprising the steps of:

capturing the images and generating image signals;

controlling the readout of lines of photosites from the image sensor responsive to a line request control signal, including the step of varying a blanking time between lines;

converting the image signals into digital image data;

storing at least one line of digital image data;

providing the digital image data read from the digital memory to the host computer; and initiating a new line readout in response to the line request control signal indicating the fullness of the digital memory.

* * * * *